(12) United States Patent
Zhou et al.

(10) Patent No.: US 12,273,819 B2
(45) Date of Patent: Apr. 8, 2025

(54) WIRELESS DEVICE FEEDBACK OF DESIRED DOWNLINK POWER ADJUSTMENT

(71) Applicant: QUALCOMM Incorporated, San Diego, CA (US)

(72) Inventors: Yan Zhou, San Diego, CA (US); Qian Zhang, Basking Ridge, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/661,024

(22) Filed: Apr. 27, 2022

(65) Prior Publication Data

US 2023/0354203 A1   Nov. 2, 2023

(51) Int. Cl.
*H04W 52/14* (2009.01)
*H04W 16/28* (2009.01)
*H04W 52/24* (2009.01)
*H04W 52/36* (2009.01)

(52) U.S. Cl.
CPC ......... *H04W 52/143* (2013.01); *H04W 16/28* (2013.01); *H04W 52/243* (2013.01); *H04W 52/367* (2013.01)

(58) Field of Classification Search
CPC ............. H04W 52/143; H04W 52/243; H04W 52/367; H04W 52/146; H04W 52/241; H04W 52/245; H04W 16/28
See application file for complete search history.

(56) References Cited

U.S. PATENT DOCUMENTS

| | | | |
|---|---|---|---|
| 2012/0201159 A1* | 8/2012 | Morita | H04W 16/10 370/252 |
| 2019/0297584 A1* | 9/2019 | Stauffer | H04B 17/336 |
| 2023/0164698 A1* | 5/2023 | Ren | H04B 17/318 455/522 |

* cited by examiner

*Primary Examiner* — Farid Seyedvosoghi
(74) *Attorney, Agent, or Firm* — Guang Y. Zhang; Procopio, Cory, Hargreaves & Savitch LLP

(57) ABSTRACT

A network node may output downlink communication for a UE. The UE may receive the downlink communication from the network node. The UE may transmit, to the network node, a request for a first downlink transmission power adjustment for the downlink communication from the network node to the UE. The network node may obtain the request from the UE for the first downlink transmission power adjustment for the downlink communication from the network node to the first UE.

30 Claims, 11 Drawing Sheets

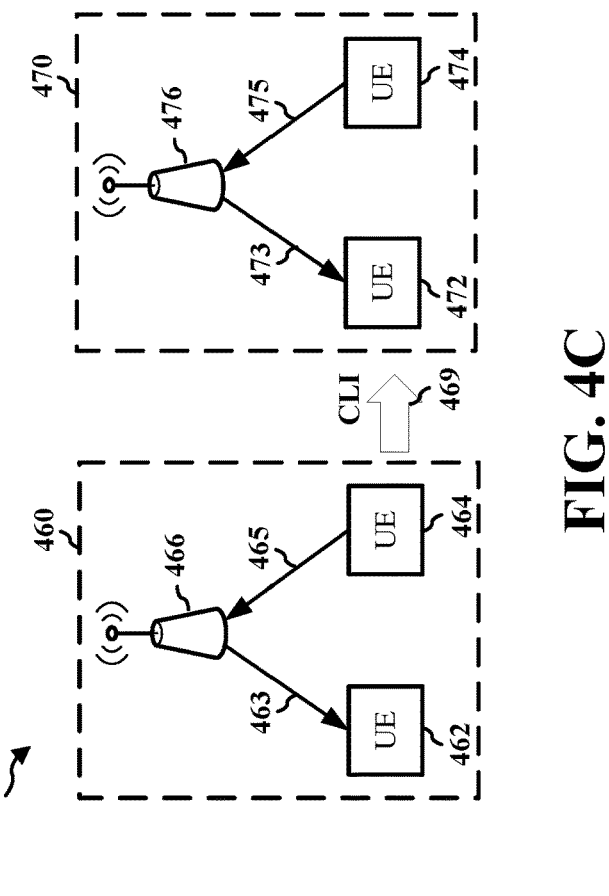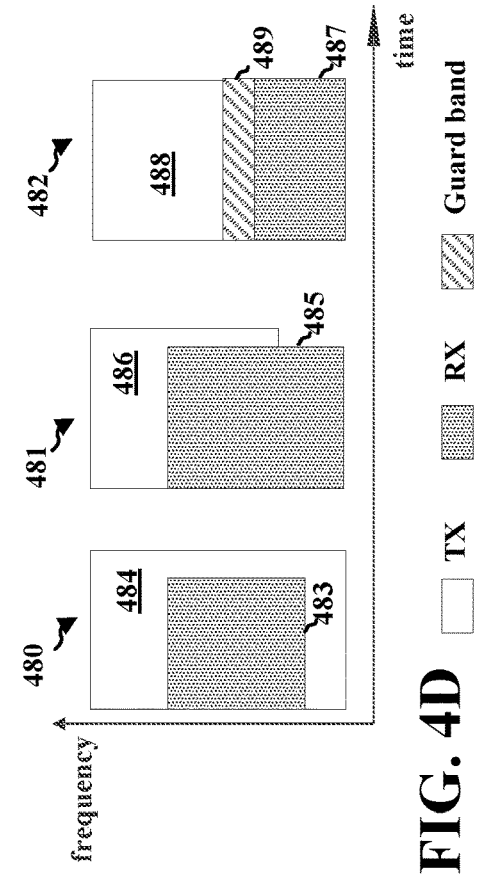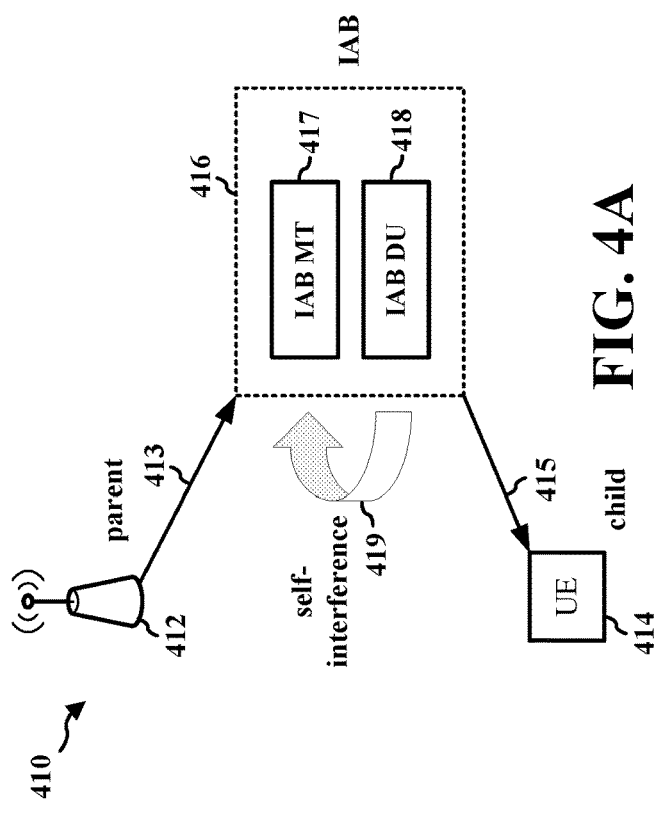
FIG. 4B
FIG. 4C
FIG. 4A
FIG. 4D

WIRELESS DEVICE FEEDBACK OF DESIRED DOWNLINK POWER ADJUSTMENT

TECHNICAL FIELD

The present disclosure relates generally to communication systems, and more particularly, to a power and interference management system for wireless device transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus may have a memory and at least one processor coupled to the memory. Based at least in part on information stored in the memory, the at least one processor may be configured to receive downlink communication from a network node. The at least one processor may be further configured to transmit, to the network node, a request for a first downlink transmission power adjustment for the downlink communication from the network node to the UE.

In another aspect of the disclosure, a method, a computer-readable medium, and an apparatus at a network node are provided. The apparatus may have a memory and at least one processor coupled to the memory. Based at least in part on information stored in the memory, the at least one processor may be configured to output downlink communication for a first UE. The at least one processor may be further configured to obtain a request from the first UE for a first downlink transmission power adjustment for the downlink communication from the network node to the first UE.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A shows a diagram illustrating an example of a wireless communications system having an integrated access backhaul (IAB) that may experience self-interference while operating in FD mode.

FIG. 4B shows a diagram illustrating an example of a wireless communications system in a cell having a network node in communication with a first UE and a second UE that may experience CLI with respect to one another while the network node operates in FD mode.

FIG. 4C shows a diagram illustrating an example of a wireless communications system having UEs in separate cells that may experience inter-cell CLI between UEs in different cells.

FIG. 4D illustrates examples of full-duplex communication resources.

DETAILED DESCRIPTION

Figure 1:
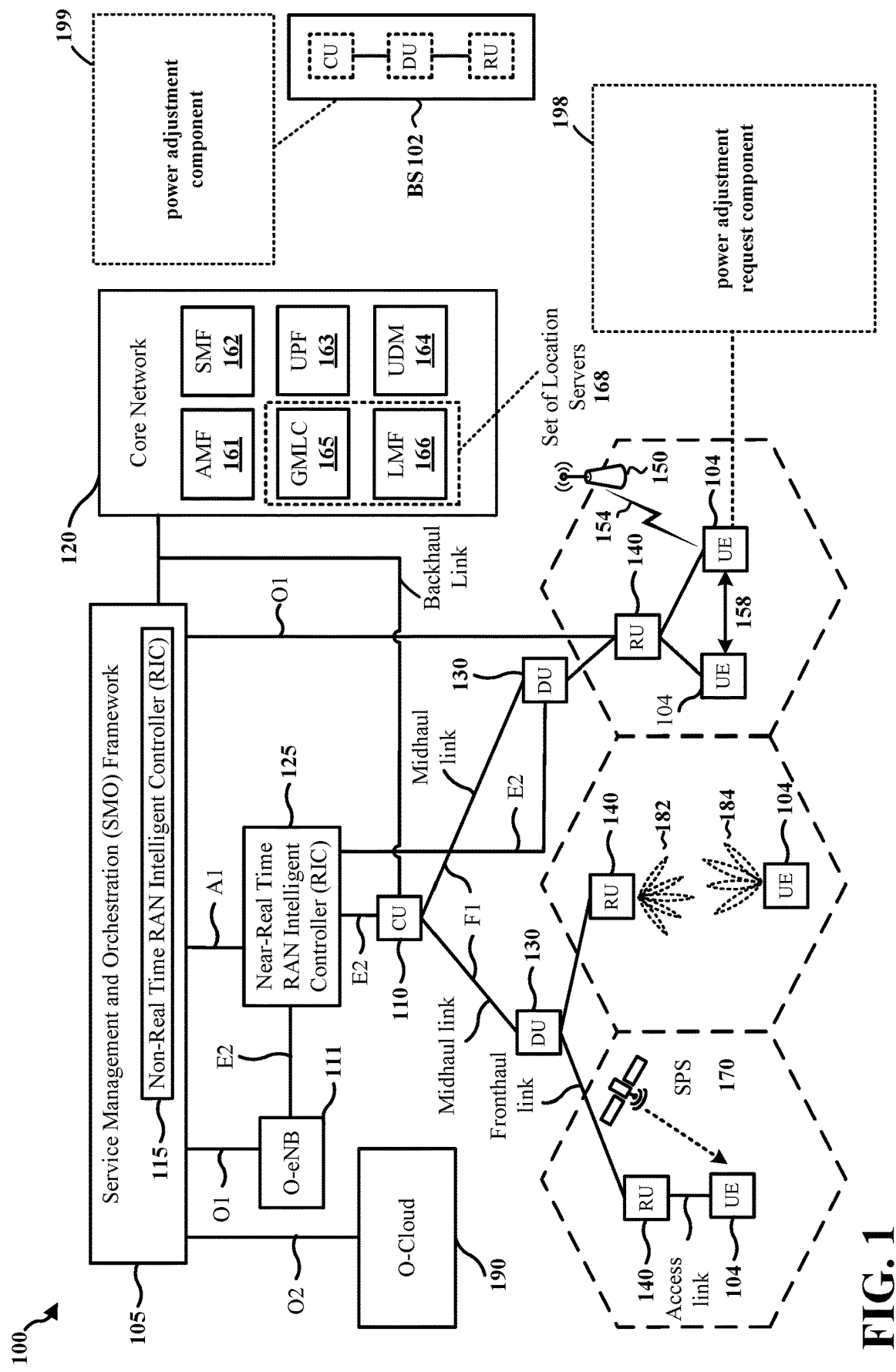
FIG. 1 is a diagram illustrating an example of a wireless communications system and an access network.

Interference between wireless transmissions of different wireless devices may occur whenever a transmit (Tx) beam is sent at the same time as a receive (Rx) beam. For example, self-interference (SI) may occur with a full duplex (FD) device that simultaneously sends a Tx beam to one device using one panel while receiving an Rx beam from another device using another panel. Cross-link interference (CLI) may occur between UEs when one UE sends a Tx beam while another UE is receiving an Rx beam. Interference between Tx signals and Rx signals may be resolved using a CLI framework by identifying periodic CLI resources, measuring the effects of such periodic CLI resources, and providing a CLI report to a network node. However, the creation and transmission of such CLI reports may be inflexible and time-consuming.

Aspects presented herein provide for a wireless communication device that receives a downlink communication from a network node and may be configured to transmit, to the network node, a request for a first downlink transmission power adjustment for the downlink communication. The request may be generated based on a determination that the downlink communication causes interference with an uplink transmission. Such a request may rapidly and flexibly provide feedback for a desired Power adjustment to the network node, which may use the feedback to adjust the transmission power of the aggressor signal or the victim signal to minimize interference with the uplink transmission.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive downlink communication from a network node using power adjustment request component 198. The UE 104 may also be configured to transmit, to the network node, a request for a first downlink transmission power adjustment for the downlink communication from the network node to the UE using power adjustment request component 198. In certain aspects, the base station 102 may be configured to output downlink communication for a first UE using power adjustment component 199. The base station 102 may be further configured to obtain a request from the first UE for a first downlink transmission power adjustment for the downlink communication from the network node to the first UE. Although the following description may be focused on 5G NR, the concepts described herein may be applicable to other similar areas, such as LTE, LTE-A, CDMA, GSM, and other wireless technologies.

Figure 2:
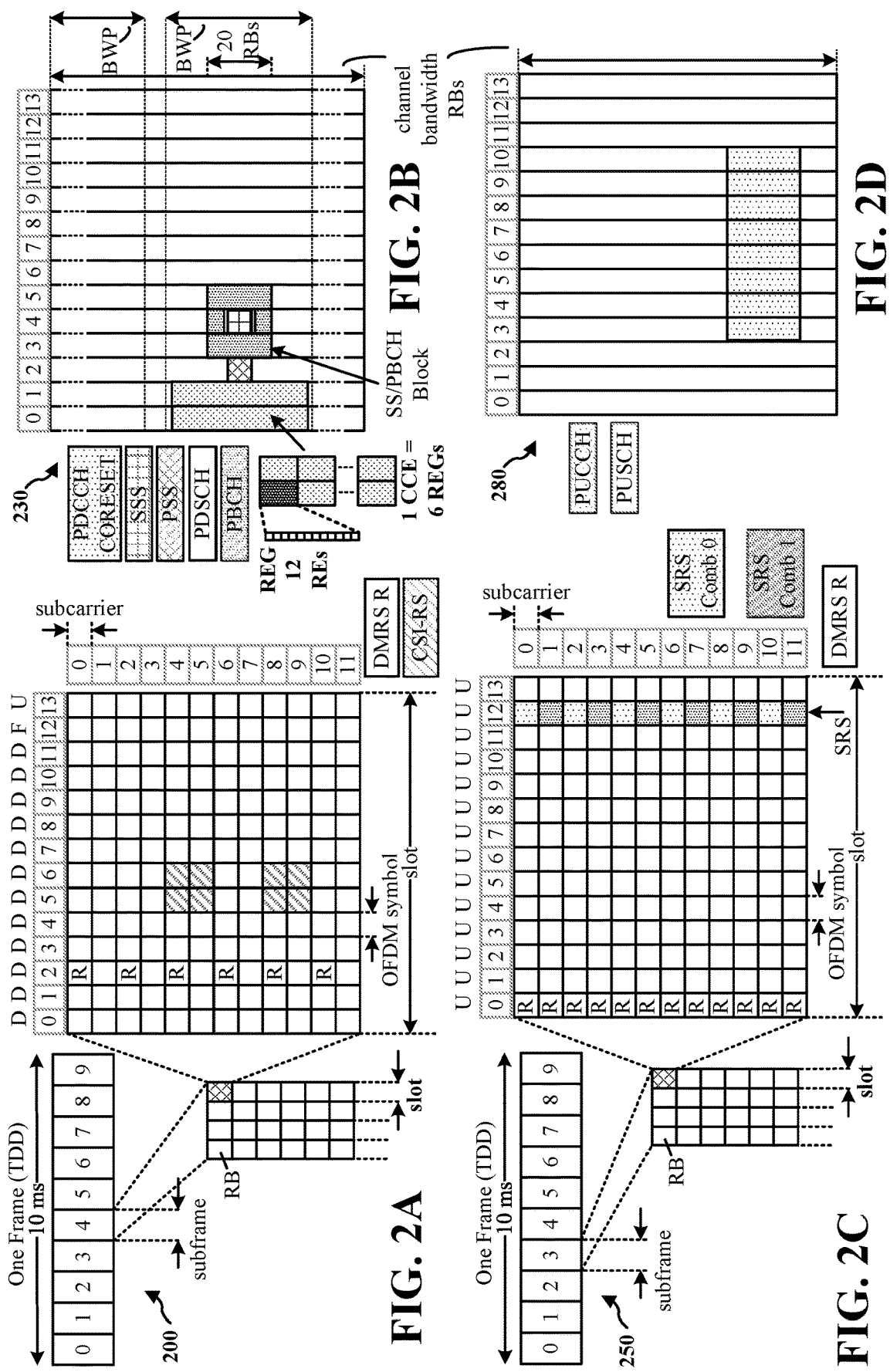
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SC S) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
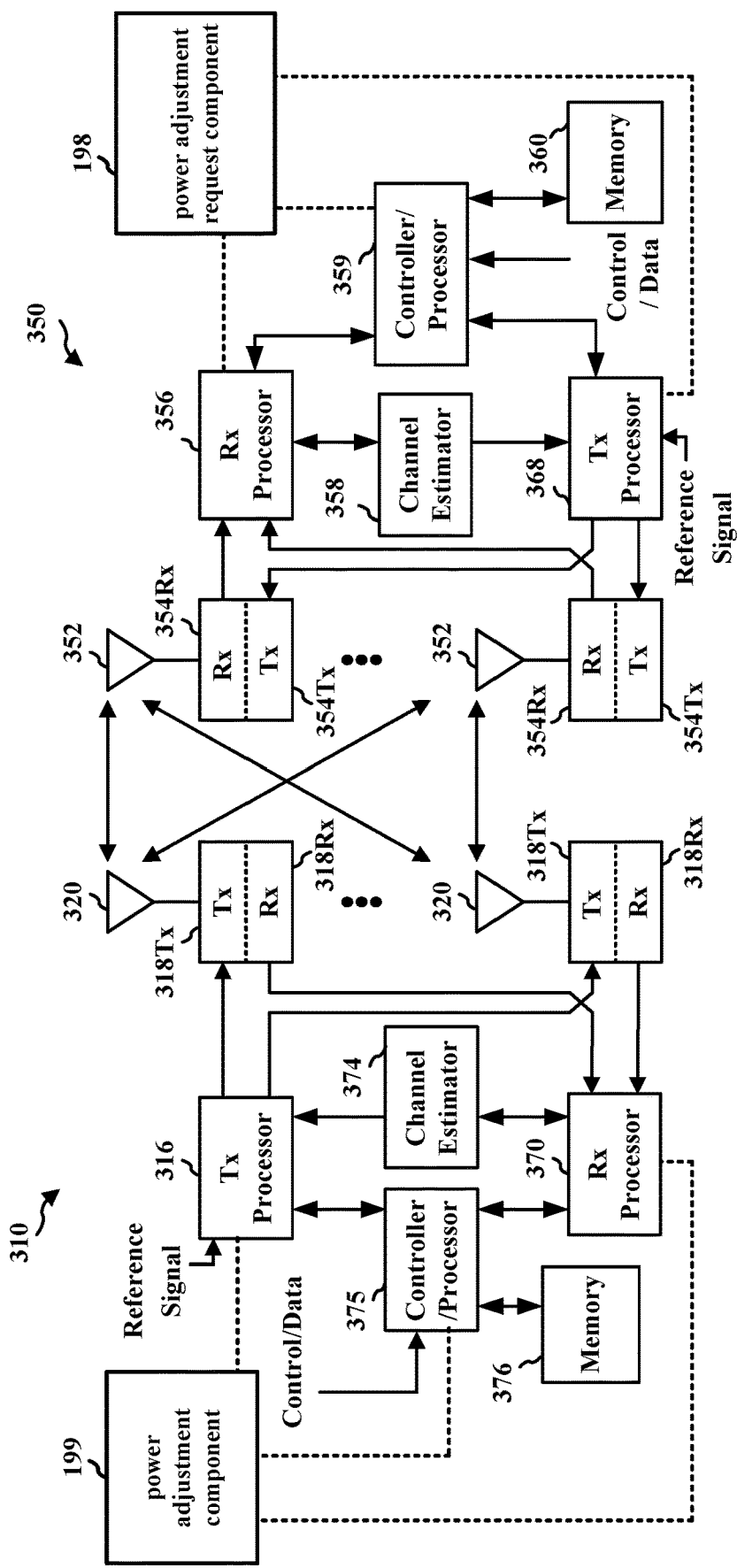
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the power adjustment request component 198 of FIG. 1.

At least one of the Tx processor 316, the Rx processor 370, and the controller/processor 375 may be configured to perform aspects in connection with the power adjustment component 199 of FIG. 1.

When multiple wireless devices receive transmissions at the same time, the transmissions may interfere with one another. For example, a first transmission sent from a first wireless device to a second wireless device may interfere with a second transmission being sent from a third wireless device to a fourth wireless device. Such situations may occur more often when wireless devices are capable of full duplex (FD) simultaneous uplink/downlink transmission. FD capability may be present on any wireless device, such as a network node or a UE. In one aspect, a UE operating in FD mode may simultaneously perform an UL transmission at one panel and a DL reception at another panel. In another aspect, a network node operating in FD mode, such as a FD TRP, may simultaneously perform an UL transmission at one panel and a DL reception at another panel. A single wireless device's UL/DL beams may even interfere with one another, causing self-interference between the UL and DL beams for the same device, or clutter echo (e.g., caused by direct leakage from a transmitter to a receptor, or caused by a reflector that reflects a signal back to a reception panel).

FIG. 4D illustrates an example of Full-duplex communication may be in a same frequency band. The transmission and reception, such as uplink and downlink communication, may be in different frequency subbands, in the same frequency subband, or in partially overlapping frequency subbands. FIG. 4D illustrates a first example 480 and a second example 481 of in-band full-duplex (IBFD) resources and a third example 482 of sub-band full-duplex resources. In IBFD, signals may be transmitted and received in overlapping times and overlapping in frequency. As shown in the first example 480, a time and a frequency allocation of transmission resources 484 may fully overlap with a time and a frequency allocation of reception resources 483. In the second example 481, a time and a frequency allocation of transmission resources 486 may partially overlap with a time and a frequency of allocation of reception resources 485.

IBFD is in contrast to sub-band FDD, where transmission and reception resources may overlap in time using different frequencies, as shown in the third example 482. In the third example 482, the transmission resources 488 are separated from the reception resources 487 by a guard band 489. The guard band may be frequency resources, or a gap in frequency resources, provided between the transmission resources 488 and the reception resources 487. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a base station or a device implementing base station functionality, the transmission resources 484, 486, and 488 may correspond to downlink resources, and the reception resources 483, 485, and 487 may correspond to uplink resources.

Interference between wireless transmissions may occur whenever a transmit (Tx) beam is sent at the same time as a receive (Rx) beam. For example, self-interference (SI) may occur with a FD device that simultaneously sends a Tx beam to one device using one panel while receiving an Rx beam from another device using another panel. Cross-link interference (CLI) may occur between UEs when one UE sends a Tx beam while another UE is receiving an Rx beam. Such interference may be more common when transmitting or receiving resources in FR2, as many wireless devices use those resources. Such interference may prevent a receiving device from successfully decoding a received signal.

FIG. 4A shows a diagram 410 illustrating an example of a wireless communications system having an integrated access backhaul (IAB) 416 that may experience self-interference while operating in FD mode. IAB 416 may be a component of a base station. IAB 416 has an IAB mobile termination (IAB MT) 417 that may be configured to communicate with its parent network node 412 and has an IAB DU 418 that may be configured to communicate with its child UE 414. Each of IAB MT 417 and IAB DU 418 may have an antenna panel that operates independently of the other antenna panel. IAB 416 may be configured to conduct simultaneous operation of its child and parent links. In one aspect, the IAB 416 may conduct an Rx with its IAB MT 417 by receiving a signal from its parent network node 412 and may simultaneously conduct an Rx with its IAB DU 418 by receiving a signal from its child UE 414 (i.e., simultaneous reception mode). In another aspect, the IAB 416 may conduct a Tx with its IAB MT 417 by transmitting a signal to its parent network node 412 and may simultaneously conduct a Tx with its IAB DU 418 by transmitting a signal to its child UE 414 (i.e., simultaneous transmission mode). In another aspect, the IAB 416 may conduct a Tx with its IAB MT 417 by transmitting a signal to its parent network node 412 and may simultaneously conduct an Rx with its IAB DU 418 by receiving a signal from its child UE 414. In another aspect, the IAB 416 may conduct an Rx with its IAB MT 417 by receiving a signal from its parent network node 412 and may simultaneously conduct a Tx with its IAB DU 418 by transmitting a signal to its child UE 414. Transmissions that occur simultaneously may have overlapping resources (e.g., overlapping time periods and overlapping frequency bands).

In some aspects, IAB 416 may support simultaneous operation of each of the aforementioned four aspects of FD transmission. When IAB 416 is in simultaneous transmission mode or simultaneous reception mode, IAB 416 does not experience SI. However, when one panel of IAB 416 is operating in Tx mode while another panel of IAB 416 is operating in Rx mode, IAB 416 may experience SI. For example, IAB MT 417 may operate in Rx mode by receiving signal 413 from its parent network node 412 while IAB DU 418 operates in Tx mode by transmitting signal 415 to its child UE 414. Such a condition may occur when IAB 416 acts as an intermediary layer between its child UE 414 and its parent network node 412 when the child UE 414 performs a DL Rx from the parent network node 412 via the IAB 416. If the IAB MT 417 receives the signal 413 from its parent network node 412 at the same time that the IAB DU transmits the signal 415 to its child UE 414, SI 419 may occur at the IAB 416. In other words, the transmitted signal 415 from the IAB DU 418 to its child UE 414 may interfere with the IAB 416 successfully decoding the received signal 413 from its parent network node 412 at the IAB MT 417.

FIG. 4B shows a diagram 420 illustrating an example of a wireless communications system in a cell 430 having a network node 426 in communication with a UE 422 and a UE 424 that may experience CLI while the network node 426 operates in FD mode. In one aspect, each of the UE 422 and the UE 424 may be a half duplex (HD) UE and the network node 426 may be a FD base station. Network node 426 may include one or more TRP s. Network node 426 may have at least two antenna panels: a first antenna panel configured to communicate with the UE 422 and a second antenna panel configured to communicate with the UE 424. Each of the antenna panels may operate independently of one another. The network node 426 may be configured to conduct simultaneous communication with the UE 422 and the UE 424 (i.e., the communication transmissions have overlapping resources). In one aspect, the network node 426 may conduct an Rx by receiving a signal from the UE 422 and may simultaneously conduct an Rx by receiving a signal from UE 424 (i.e., simultaneous reception mode). In another aspect, the network node 426 may conduct a Tx by transmitting a signal the UE 422 and may simultaneously conduct a Tx by transmitting a signal to the UE 424 (i.e., simultaneous transmission mode). In another aspect, the network node 426 may conduct a Tx by transmitting a signal to the UE 422 and may simultaneously conduct an Rx by receiving a signal from the UE 424. In another aspect, the network node 426 may conduct an Rx by receiving a signal from the UE 422 and may simultaneously conduct a Tx by transmitting a signal to the UE 424.

In some aspects, the network node 426 may support simultaneous operation of each of the aforementioned four aspects. When the network node 426 is in simultaneous transmission mode or simultaneous reception mode, the UE 422 and 424 may not experience CLI. However, when one panel of the network node 426 is operating in Tx mode while another panel of the network node 426 is operating in Rx mode, the UE 422 and 424 may experience CLI. For example, the network node 426 may operate in Rx mode by receiving a signal 425 from the UE 424 while operating in Tx mode by transmitting a signal 423 to the UE 422. If the UE 422 receives the signal 423 from the network node 426 at the same time that the UE 424 transmits the signal 425 to the network node 426, CLI 429 may occur at the UE 422. In other words, the transmitted signal 425 from the UE 424 to the network node 426 may interfere with the UE 422 successfully decoding the received signal 423 from the network node 426 (i.e., CLI from an aggressor UE to a victim UE). The CLI 429 may represent intra-cell CLI occurring within the same cell 430.

FIG. 4C shows a diagram 450 illustrating an example of a wireless communications system having a network node 466 in communication with a UE 462 and a UE 464 in a cell 460 and a network node 476 in communication with a UE 472 and a UE 474 in a cell 470. The UEs may experience inter-cell CLI between the cell 460 and the cell 470. Each of the cell 460 and the cell 470 may be similar to the cell 430 in FIG. 4B, where the network node 466 and the network node 476 may operate similarly to the network node 426, the UE 462 and the UE 472 may operate similarly to the UE 422, and the UE 464 and the UE 464 may operate similarly to the UE 424, respectfully. For example, in the cell 460, if the UE 462 receives the signal 463 from the network node 466 at the same time that the UE 464 transmits the signal 465 to the network node 466, CLI may occur at the UE 462. Likewise, in the cell 470, if the UE 472 receives the signal 473 from the network node 476 at the same time that the UE 474 transmits the signal 475 to the network node 476, CLI may occur at the UE 472.

While the UE 464 and the UE 472 are located in different cells 460 and 470, respectively, the UE 464 and the UE 472 may be located close to one another in such a way that their transmitted signals may interfere with one another (i.e., co-located). For example, the UE 464 and the UE 472 may be co-located within 20 m from one another. In one aspect, if the UE 472 receives the signal 473 from the network node 476 at the same time that the UE 464 transmits the signal 465 to the network node 466, CLI 469 may occur at the UE 472. The CLI 469 may prevent the UE 472 from successfully decoding the signal 473. Moreover, the transmissions may also be mis-aligned, which makes it more difficult to resolve such CLI using simple means.

Interference between Tx signals and Rx signals may be resolved using a layer 3 CLI framework by identifying interfering Tx signals as periodic CLI resources, configuring a wireless device (e.g., a UE, a IAB) that experiences CLI to measure the effects of such periodic CLI resources while receiving an Rx signal, and providing a CLI report to a device (e.g., a network node) that may mitigate the CLI. For example, in response to obtaining a CLI report, a network node may alter the resources used by a Tx signal and/or an Rx signal to minimize or prevent CLI between the Tx signal and the Rx signal (e.g., by minimizing resource overlap). However, CLI reports may be collected by a CU of a network node, which may be configured to alter the resources used by a Tx signal or an Rx signal by informing a DU of a network node. Exchanging such data using layer 3 protocols may be time-consuming and may have a high amount of latency. Such latency may be exacerbated by CLI frameworks that use configuration updates, as the wireless devices may repeatedly undergo time-consuming RRC configuration. A CLI framework with such inherent latencies and inflexible structures may be less suitable for network systems having devices that perform rapid layer 1 beam selection in response to interference variations.

Moreover, a CLI framework that configures a UE that experiences CLI to measure the effects of periodic CLI resources may require the UE to effectively implement the CLI framework to generate an effective CLI report. Such a CLI report may not provide a thorough analysis of various UE Rx beams, making such a CLI report inherently incomplete. In addition, CLI measurements using received signal strength indicator (RSSI) and/or reference signal received power (RSRP), may only provide data on wideband resources, again making such a CLI report inherently incomplete.

To overcome these deficiencies, a wireless communication device that receives a downlink communication from a network node may be configured to transmit, to the network node, a request for a first downlink transmission power adjustment for the downlink communication. The request may be generated based on a determination that the downlink communication causes interference with an Rx signal. Such a request may rapidly and flexibly provide feedback for a desired Power adjustment to the network node, which may use the feedback to adjust the transmission power of the aggressor signal or the victim signal to minimize signal interference.

Figure 5:
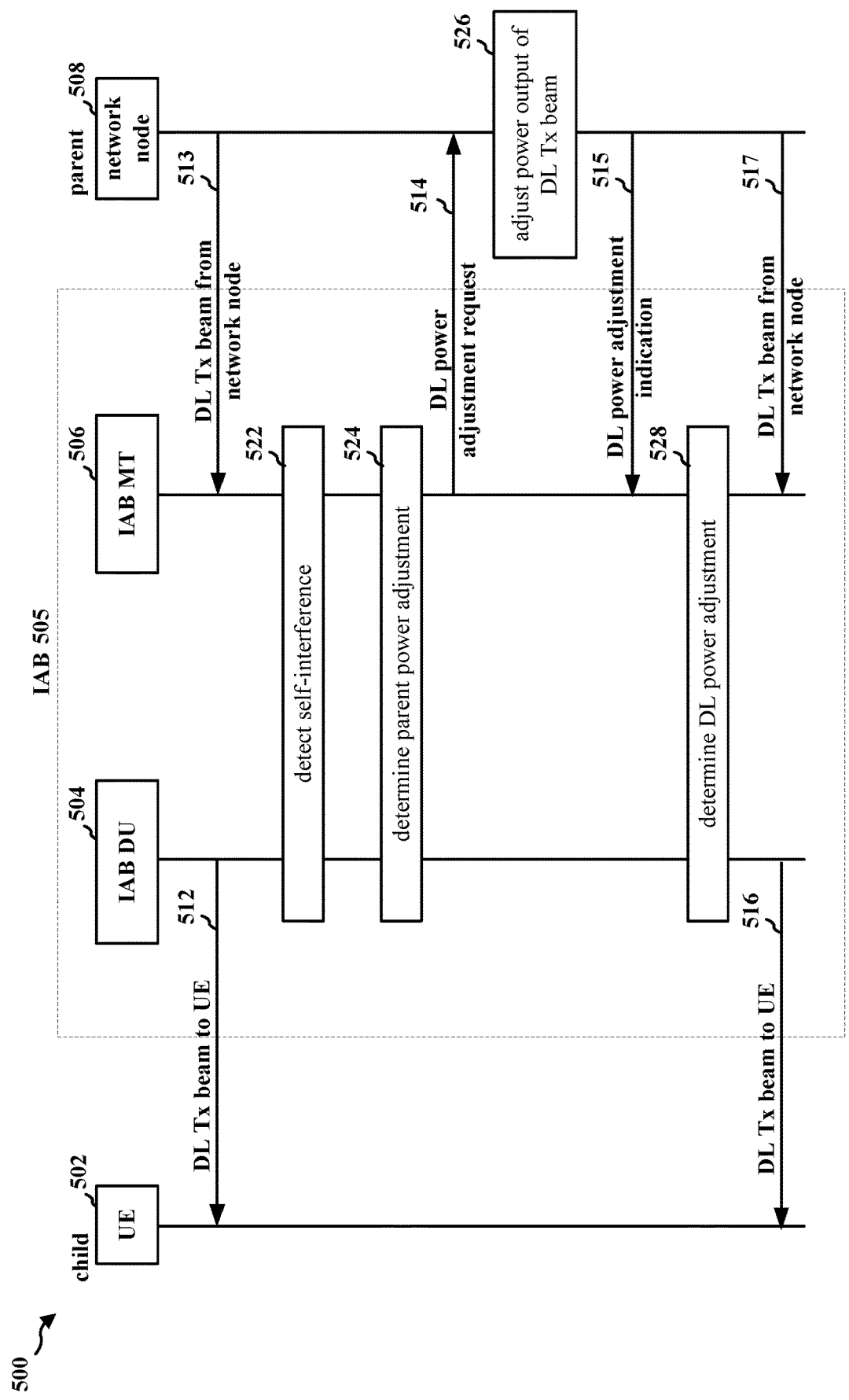
FIG. 5 shows a network connection flow diagram of an IAB that may experience self-interference while operating in FD mode.

FIG. 5 shows a network connection flow diagram 500 that illustrates an example of an IAB 505 that may experience self-interference while operating in FD mode. Network connection flow diagram 500 has an IAB 505 with an IAB DU 504 and an IAB MT 506, a child UE 502, and a parent network node 508 similar to the IAB 416 with the IAB DU 418 and the IAB MT 417, the child UE 414, and the parent network node 412 in FIG. 4A, respectively.

The IAB 505 may be configured to coordinate with the parent network node 508 using operation parameter coordination to support simultaneous operation of each of the aforementioned four aspects of FD transmission (simultaneous Rx, simultaneous Tx, Tx during Rx, and Rx during Tx) while minimizing occurrences of FD SI at the IAB 505. Such coordinated parameters may include, for example, power control (PC) parameters, beam parameters, and/or Tx/Rx timing parameters. Such coordination may be extended to any next generation node B (gNB) FD devices, or base station devices, such as the base station 102 in FIG. 1. To mitigate SI between the IAB DU 504 to the IAB MT 506, the IAB 505 may be configured to feedback a desired IAB-MT Power adjustment to its parent network node 508.

In one aspect, the IAB 505 may be configured to provide/indicate a desired power adjustment to its parent network node 508 via IAB MT 506 to assist with the parent network node Tx power allocation at least for specific time resources. The IAB 505 may associate the desired power adjustment with a spatial configuration, for example the IAB MT 506's DL Rx beams. In another aspect, the IAB 505 may be configured to support an IAB-node indicating adjustment to its DL Tx power as a child node of its parent network node 508 (e.g., in response to receiving the DL Tx power assistance information from the IAB 505) at least for specific time resources. The IAB 505 may associate the desired Power adjustment with a spatial configuration, for example the IAB DU 4504's DL Rx beams.

For example, IAB 505 may act as a bridge between the child UE 502 and the parent network node 508 during a DL Tx. The parent network node 508 may output the DL Tx beam 513 to the IAB MT 506. The IAB DU 504 may output the DL Tx beam 512 to the UE 502. The IAB 505 may simultaneously receive the DL Tx beam 513 from the parent network node 508 via the IAB MT 506 while also transmitting the DL Tx beam 512 to the child UE 502 via the IAB DU 504. At 522, the IAB 505 may detect that SI exists from the IAB DU 504 to the IAB MT 506. Specifically, the IAB 505 may detect that the DL Tx beam 512 output by the IAB DU interferes with successfully decoding the DL Tx beam 513 obtained by the IAB MT 506. At 524, the IAB 505 may determine a parent power adjustment for the parent network node 508 to use with the DL Tx beam 513 to minimize the detected SI. For example, the IAB 505 may determine a parent power adjustment of the DL Tx beam 512 to be at or above a multiplier (e.g., 1.2) of the power level used by the IAB DU 504. The IAB 505 may send a request 514 to the parent network node 508 to adjust its DL Tx power in response to the detected CLI (e.g., a recommendation to adjust the DL Tx power to meet or exceed a threshold). The request 514 may be indicated in an acknowledgement/negative acknowledgement (ACK/NACK) for a downlink transmission from the parent network node 508, such as the DL Tx beam 513. For example, the request 514 may include a NACK of a failed decoding of the DL Tx beam 513 along with a DL power adjustment suggestion of a suggested power level for the DL Tx beam 513 that may not interfere with the DL Tx beam 512.

At 526, the parent network node 508 may adjust a power output of a DL Tx beam in response to the request 514. The parent network node 508 may obtain a plurality of requests from multiple devices, and may decide on how best to adjust a DL Tx beam based on one or more of the obtained requests. In one aspect, in response to receiving the request 514 to adjust its DL Tx power to meet or exceed a threshold, the parent network node 508 may increase its DL Tx power to transmit the DL Tx beam 517. This may allow the IAB 505 to successfully decode the DL Tx beam 517 transmitted with higher power from the parent network node 508 while simultaneously transmitting the DL Tx beam 516 to the child UE 502. In another aspect, in response to receiving the request 514 to adjust its DL Tx power to meet or exceed a threshold, the parent network node 508 may output an indication 515 to adjust a DL Tx power of its child node (the IAB 505) to meet or be below a threshold. At 528, in response to receiving the indication 515 to adjust its DL Tx power to meet or be below a threshold, the IAB 505 may lower its DL Tx power to transmit the DL Tx beam 516, which may allow the IAB 505 to successfully decode the DL Tx beam 517 from the parent network node 508 while simultaneously transmitting the DL Tx beam 516 to the child UE 502 with less power. In another aspect, the parent network node 508 may both output the indication 515 to the IAB MT 506 to adjust its DL Tx power output of the DL Tx beam 516 and may also adjust a DL Tx power output of the DL Tx beam 517 in accordance with the request 514.

Figure 6:
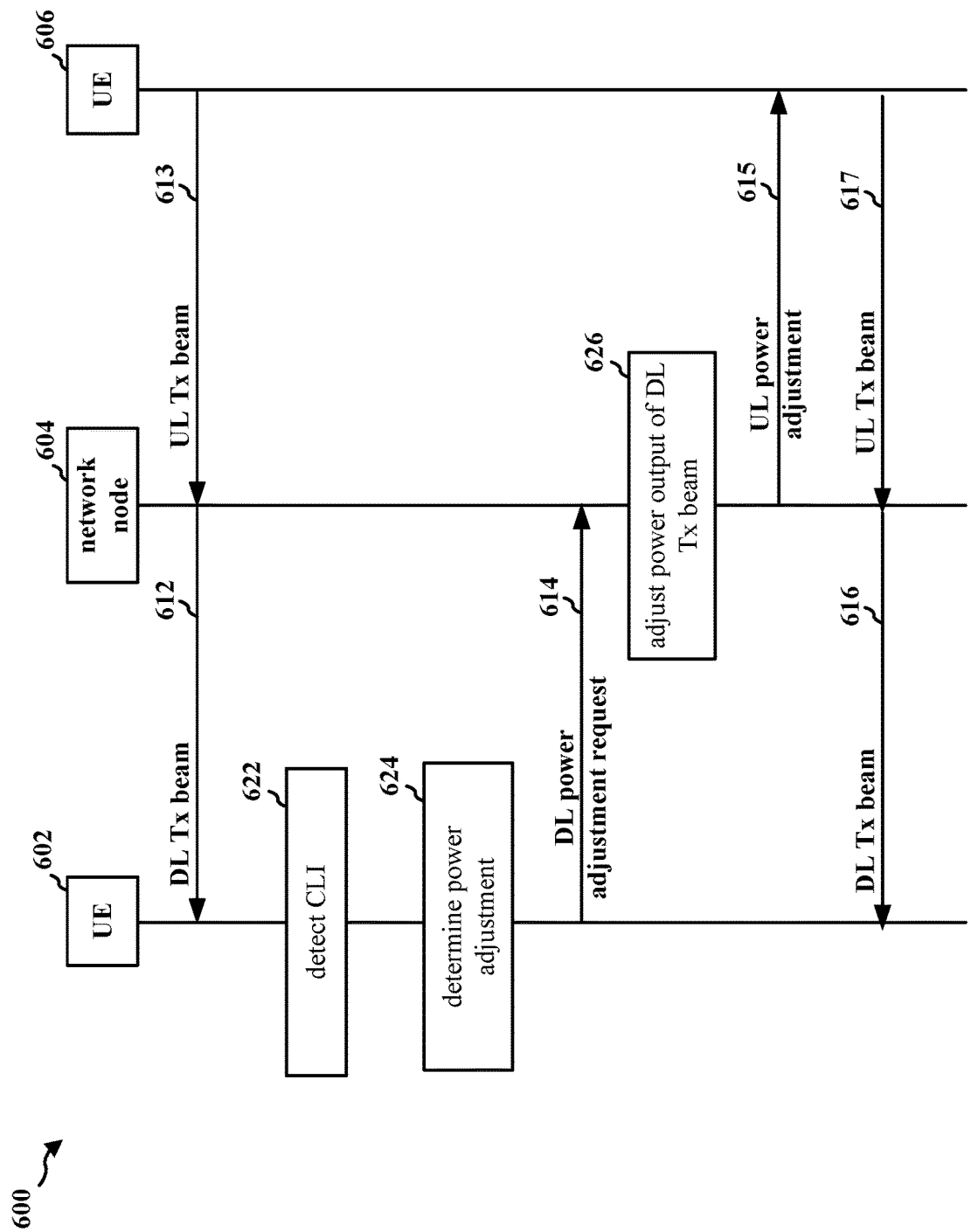
FIG. 6 shows a network connection flow diagram of a wireless communications system having a network node in communication with a first UE and a second UE that may experience CLI while the network node operates in FD mode.

FIG. 6 shows a network connection flow diagram 600 that illustrates an example of a wireless communications system having a network node 604 in communication with a UE 602 and a UE 606 that may experience CLI while the network node 604 operates in FD mode. Network connection flow diagram 600 has a UE 602, a UE 606, and a network node 604, similar to the UE 422, the UE 424, and the network node 426 in FIG. 4B, respectively. In FIG. 6, a UE 602 communicating with the network node 604 operating in FD mode may feedback a desired DL power adjustment to the network node 604 based on interference from an UL transmission to the network node 604 from another UE.

The network node 604 may also experience SI, for example the DL Tx beam 612 output by the network node 604 may interfere with the UL Tx beam 613 received by the network node 604. However, the network node 604 may have better control over scheduling and power output to minimize interference at the network node 604, and thus may not require power adjustment requests to be transmitted between devices in order to minimize SI at the network node 604.

The network node 604 may obtain the UL Tx beam 613 from the UE 606 while outputting the DL TX beam to the UE 602. In other words, the UE 606 may transmit the UL Tx beam 613 to the network node 604 at the same time the UE 602 receives the DL TX beam from the network node 604. At 622, the UE 602 may detect CLI. For example, the UE 602 may determine that the UL Tx beam 613 interferes with a successful decoding of the DL TX beam. The detected CLI may be based on a PDSCH demodulation and reference signal (DMRS) of the DL TX beam. In one aspect, the UE 602 may be configured to detect a CLI in response to a triggered event (e.g., a number of failed decodes within a time period), to detect a CLI in response to a scheduled time period for CLI detection, or to detect a CLI in response to a periodic schedule for CLI detection.

At 624, the UE 602 may determine a parent power adjustment (i.e., power boost) that may help to minimize CLI. The power adjustment may include any suitable recommended value based on the detected CLI that may be used to minimize detected CLI. In one aspect, the power adjustment may be based on the PDSCH DMRS of the DL TX beam without requiring a CLI measurement resource. In another aspect, the power adjustment may be generated based on the received modulation and coding scheme (MCS) of the DL Tx beam 612 or the UL Tx beam 613. For example, a more complex MCS may be indexed against a higher power adjustment and a simpler MCS may be indexed against a lower power adjustment. In another aspect, the power adjustment may be generated based on a transport block size of the DL Tx beam 612 or the UL Tx beam 613. For example, a larger transport block size may be indexed against a higher power adjustment and a smaller transport block size may be indexed against a lower power adjustment. In another aspect, the power adjustment may be generated in terms of a DL channel or a reference energy per resource element (EPRE). For example, the power adjustment may include an offset relative to a reference EPRE. In another example, the power adjustment may include an offset relative to a currently used EPRE (e.g., a Δ of PDSCH EPRE). In another aspect, the power adjustment may indicate one or more resources based on one or more DL channels, a reference EPRE, one or more beam directions, one or more frequency sub-bands, one or more symbols, or a resource pattern in at least one of a time or a frequency. In another aspect, the power adjustment may be provided per beam, per sub-band, per symbol, and/or per resource pattern. In another aspect, the power adjustment may be based on the target quality of a reference LC channel and/or RS (e.g., PDSCH with reference MCS, TB size, currently received PDSCH). In another aspect, the power adjustment may be generated based on an interference hypothesis. For example, the UE 602 may generate a power adjustment based on one or more interference measurement resources (IMR) if a corresponding interference exists, or may generate a power adjustment based on one or more CLI resources if a corresponding interference exists. In one aspect, the power adjustment may be for a subset of resources in at least one of a time or a frequency. The UE 602 may provide one or more power adjustments to the network node 604 for the network node 604 to use.

The UE 602 may transmit the request 614 to adjust a DL power of the DL Tx from the network node 604. The feedback (e.g., request 614) may piggyback on an ACK/NACK response to the DL TX beam, which may be more flexible and accurate than a CLI report. At 626, the network node 604 may adjust a power output of a beam based on the request 614. The network node 604 may obtain several requests from a plurality of UEs and/or other network nodes. The network node 604 may adjust a power output of a beam based on one or more of the requests. In one aspect, the network node 604 may increase a power output of the DL Tx beam 616 to meet or exceed a threshold level indicated in the request 614. The UE 606 may transmit the UL Tx beam 617 to the network node 604 while the network node 604 outputs the DL Tx beam 616 with the adjusted higher power level. With a higher power level for the DL Tx beam 616, the UE 602 may be able to successfully decode the DL Tx beam 616 despite interference from the UL Tx beam 617 transmitted by the UE 606.

In another aspect, the network node 604 may transmit an UL power adjustment 615 to the UE 606 to meet or be under a threshold power level. The UL power adjustment 615 may include, for example, UL PC signaling or enhanced signaling within a same network node. The UE 606 may transmit the UL Tx beam 617 to the network node 604 with the adjusted lower power level while the network node 604 outputs the DL Tx beam 616 to the UE 602. With a lower power level for the UL Tx beam 617, the UE 602 may be able to successfully decode the DL Tx beam 616 with less interference from the UL Tx beam 617 transmitted by the UE 606. In some aspects, the network node 604 may both output the DL Tx beam 616 with an adjusted higher power level and may also transmit a UL power adjustment 615 to the UE 606 to transmit the UL Tx beam 617 with an adjusted lower power level to ensure that the UE 602 may successfully decode the DL Tx beam 616 without CLI from the UL Tx beam 617 interfering with the decoding process of the UE 602.

Figure 7:
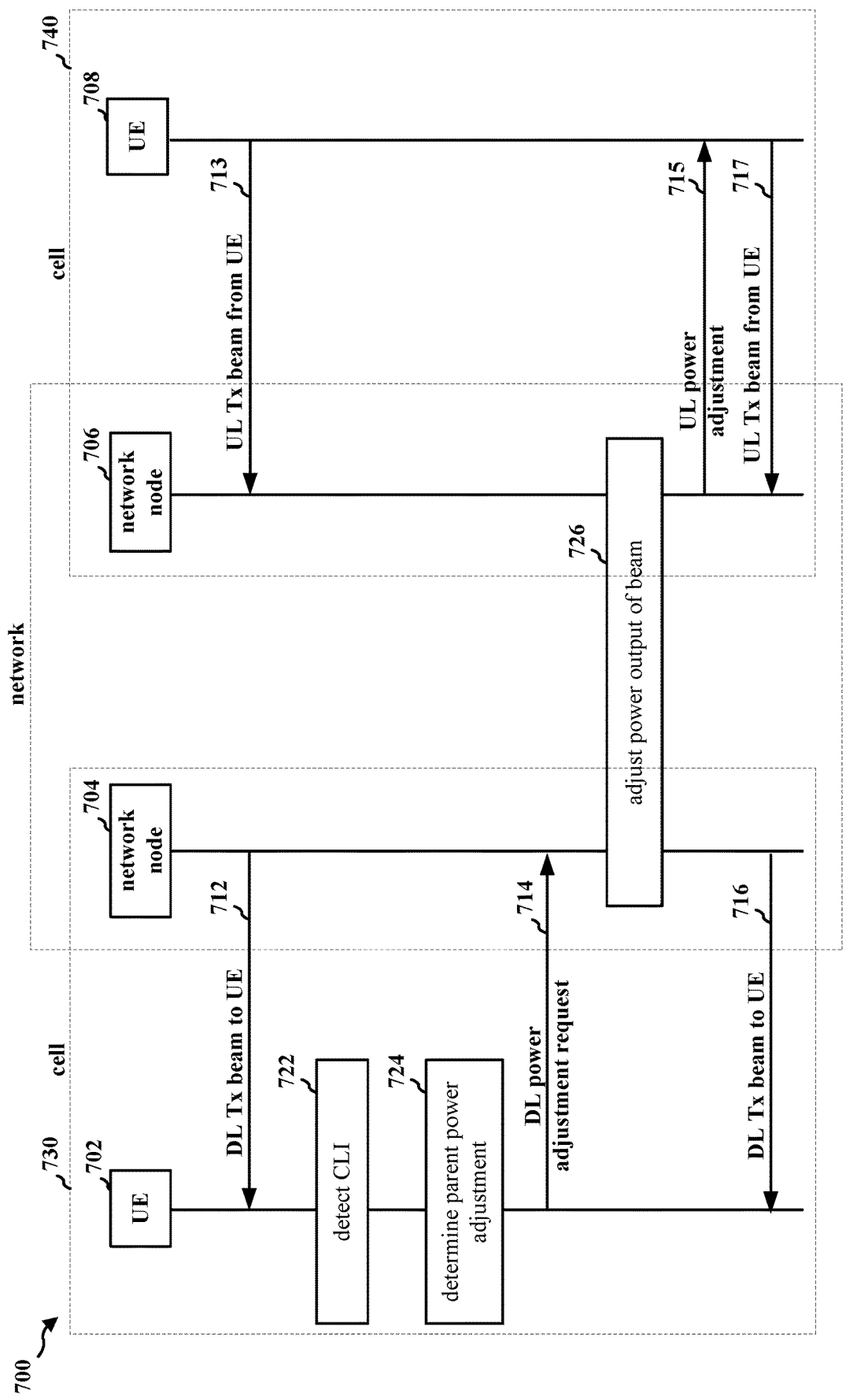
FIG. 7 shows a network connection flow diagram of a wireless communications system having UEs in separate cells that may experience inter-cell CLI between UEs in different cells.

FIG. 7 shows a network connection flow diagram 700 that illustrates an example of a wireless communications system having a network node 704 in communication with a UE 702 in a cell 730 and a network node 706 in communication with a UE 708 in a cell 740 that may experience inter-cell CLI between the cell 730 and the cell 740. Network connection flow diagram 700 has a UE 702, a UE 708 a network node 704, and a network node 706, similar to the UE 472, the UE 464, the network node 476, and the network node 466 in FIG. 4C. The framework used for the network node 604 in FIG. 6 may be extended to the network node 704 and network node 706 to feedback a desired power adjustment. The network node 704 and the network node 706 may be configured to communicate with one another using a backhaul, midhaul, or fronthaul link, or an over-the-air (OTA) link. For example, the network node 704 and the network node 706 may be separate TRPs of a common base station or the network node 704 and the network node 706 may be separate RUs that share a common DU or CU.

The network node 706 may obtain the UL Tx beam 713 from the UE 708 while the network node 704 outputs the DL Tx beam 712 to the UE 702. In other words, the UE 708 may transmit the UL Tx beam 713 to the network node 706 in cell 740 at the same time the UE 702 receives the DL Tx beam 712 from the network node 704 in cell 730. The UE 708 and the UE 702 may be co-located within a distance from one another, for example within 20 m of one another, such that the UL Tx beam 713 transmitted by the UE 708 may interfere with the UE 702 decoding the DL Tx beam 712.

At 722, the UE 702 may detect CLI. For example, the UE 702 may determine that the UL Tx beam 713 interferes with a successful decoding of the DL Tx beam 712. The detected CLI may be based on a PDSCH demodulation and reference signal (DMRS) of the DL Tx beam 712. In one aspect, the UE 702 may be configured to detect a CLI in response to a triggered event (e.g., a number of failed decodes within a time period), in response to a scheduled CLI detection event for a specific time period, or in response to a periodic CLI detection event.

At 724, the UE 702 may determine a parent power adjustment (i.e., power boost) that may help to minimize CLI. The power adjustment may include any suitable recommended value based on the detected CLI that may be used to minimize detected CLI. In one aspect, the power adjustment may be based on the PDSCH DMRS of the DL TX beam without requiring a CLI measurement resource. In another aspect, the power adjustment may be generated based on the received modulation and coding scheme (MCS)

of the DL Tx beam 712 or the UL Tx beam 713. For example, a more complex MCS may be indexed against a higher power adjustment and a simpler MCS may be indexed against a lower power adjustment. In another aspect, the power adjustment may be generated based on a transport block size of the DL Tx beam 712 or the UL Tx beam 713. For example, a larger transport block size may be indexed against a higher power adjustment and a smaller transport block size may be indexed against a lower power adjustment. In another aspect, the power adjustment may be generated in terms of a DL channel or a reference energy per resource element (EPRE). For example, the power adjustment may include an offset relative to a reference EPRE. In another example, the power adjustment may include an offset relative to a currently used EPRE (e.g., a $\Delta$ of PDSCH EPRE). In another aspect, the power adjustment may indicate one or more resources based on one or more DL channels, a reference EPRE, one or more beam directions, one or more frequency sub-bands, one or more symbols, or a resource pattern in at least one of a time or a frequency. In another aspect, the power adjustment may be provided per beam, per sub-band, per symbol, and/or per resource pattern. In another aspect, the power adjustment may be based on the target quality of a reference LC channel and/or RS (e.g., PDSCH with reference MCS, TB size, currently received PDSCH). In another aspect, the power adjustment may be generated based on an interference hypothesis. For example, the UE 702 may generate a power adjustment based on one or more interference measurement resources (IMR) if a corresponding interference exists, or may generate a power adjustment based on one or more CLI resources if a corresponding interference exists. In one aspect, the power adjustment may be for a subset of resources in at least one of a time or a frequency. The UE 702 may provide one or more power adjustments to the network node 704 for the network to use.

The UE 702 may transmit the request 714 to adjust a DL power of the DL Tx from the network node 704. The feedback (e.g., request 714) may piggyback on an ACK/NACK response to the DL Tx beam 712, which may be more flexible and accurate than a CLI report. At 726, the network node 704 may adjust a power output of the DL Tx beam 716 and/or the UL Tx beam 717 based on the request 714. In one aspect, the network node 704 may increase a power output of the DL Tx beam 716 to meet or exceed a threshold level indicated in the request 714. The UE 708 may transmit the UL Tx beam 717 to the network node 706 while the network node 704 outputs the DL Tx beam 716 with the adjusted power level. With a higher power level for the DL Tx beam 716, the UE 702 may be able to successfully decode the DL Tx beam 716 despite interference from the UL Tx beam 717 transmitted by the UE 708.

In another aspect, the network node 706 may transmit an UL power adjustment 715 to the UE 708 to meet or be under a threshold power level. The UL power adjustment 715 may include, for example, UL PC signaling. The UE 708 may transmit the UL Tx beam 717 to the network node 706 with the adjusted lower power level while the network node 704 outputs the DL Tx beam 716 to the UE 702. With a lower power level for the UL Tx beam 717, the UE 702 may be able to successfully decode the DL Tx beam 716 with less interference from the UL Tx beam 717 transmitted by the UE 708. In some aspects, the network node 704 may output the DL Tx beam 716 with an adjusted higher power level and the network node 706 may also transmit a UL power adjustment 715 to the UE 708 to transmit the UL Tx beam 717 with an adjusted lower power level to ensure that the UE 702 may successfully decode the DL Tx beam 716 without CLI from the UL Tx beam 717 interfering with the decoding process.

Figure 8:
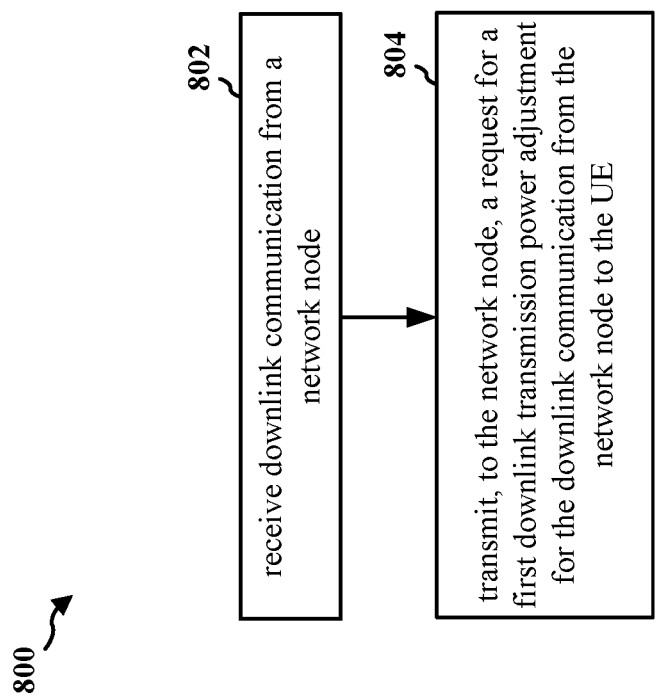
FIG. 8 is a flowchart of a method of wireless communication.

FIG. 8 is a flowchart 800 of a method of wireless communication. The method may be performed by a UE (e.g., the UE 104, UE 350, UE 422, UE 472, UE 602, UE 702; IAB 416, IAB 505; the apparatus 1004). At 802, the UE may receive downlink communication from a network node. For example, 802 may be performed by the UE 602 in FIG. 6, which may receive a DL Tx beam 612 from the network node 604. 802 may also be performed by the apparatus 1004 in FIG. 10.

At 804, the UE may transmit, to the network node, a request for a first downlink transmission power adjustment for the downlink communication from the network node to the UE. For example, 804 may be performed by the UE 602 in FIG. 6, which may transmit, to the network node 604, a request 614 for a first downlink transmission power adjustment for the DL Tx beam 616 from the network node 604 to the UE 602. 804 may also be performed by the apparatus 1004 in FIG. 10.

Figure 9:
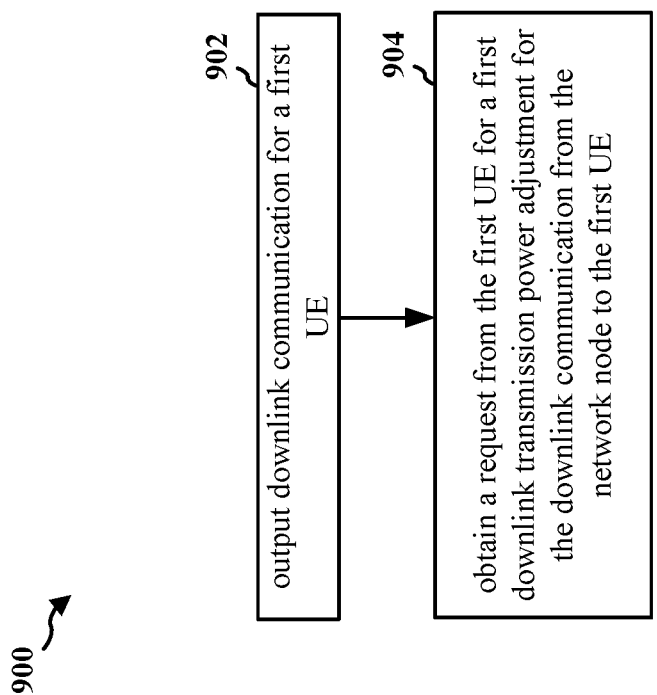
FIG. 9 is a flowchart of a method of wireless communication.

FIG. 9 is a flowchart 900 of a method of wireless communication. The method may be performed by a base station (e.g., the base station 102, 310; the network node 412, 426, 466, 476, 508, 604, 704, 706; the network entity 1002, 1102. At 902, the base station may output downlink communication for a first UE. For example, 902 may be performed by the network node 604 in FIG. 6, which may output a DL Tx beam 612 to the UE 602. 902 may also be performed by the network entity 1102 in FIG. 11.

At 904, the base station may obtain a request from the first UE for a first downlink transmission power adjustment for the downlink communication from the network node to the first UE. For example, 904 may be performed by the network node 604 in FIG. 6, which may obtain a request 614 from the UE 602 for a first Power adjustment for the DL Tx beam 616 from the network node 604 to the UE 602. 904 may also be performed by the network entity 1102 in FIG. 11.

Figure 10:
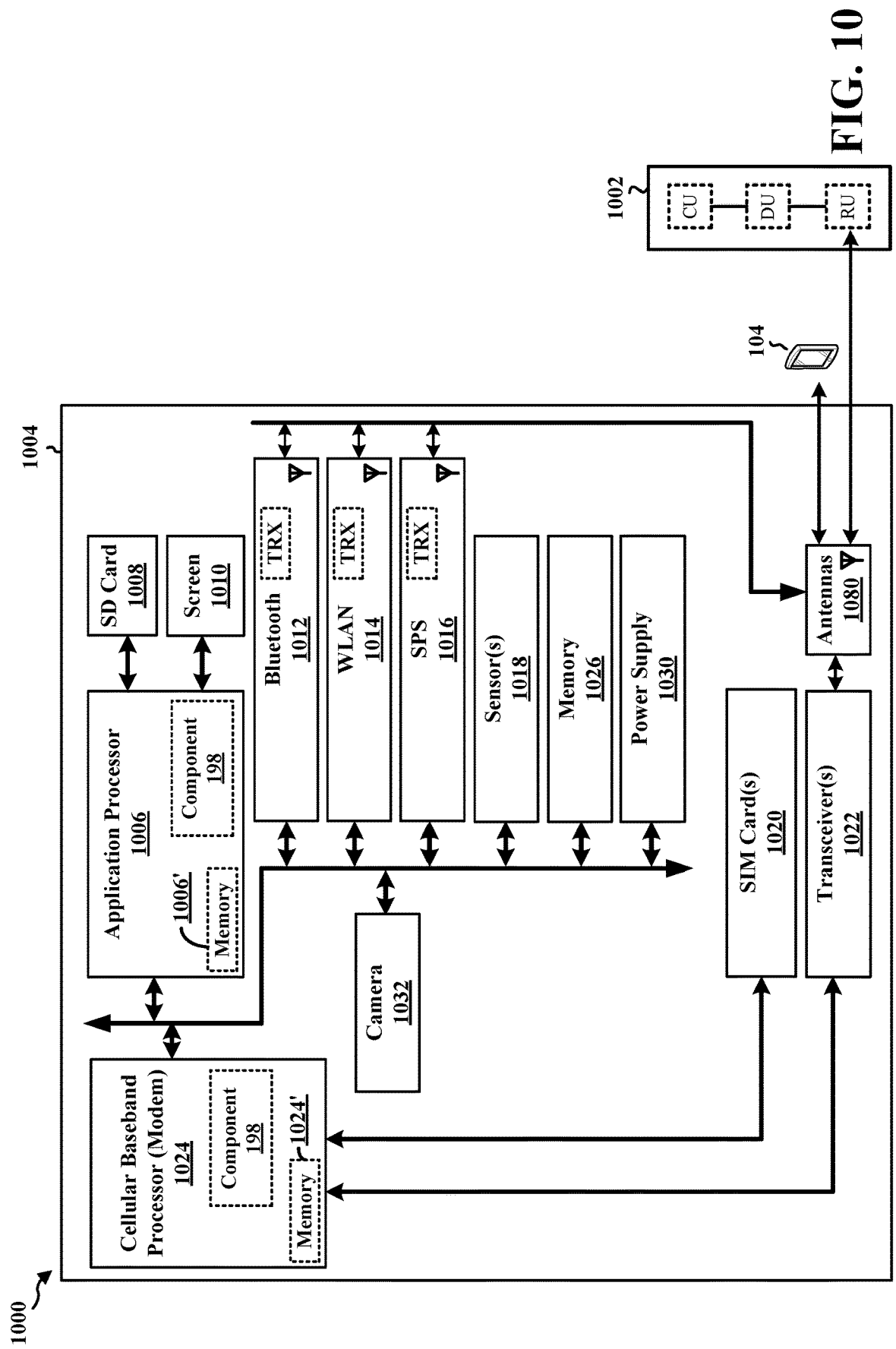
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRx) (or in some cases, just a receiver (Rx)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the Tx processor 368, the Rx processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see UE 350 of FIG. 3) and include the additional modules of the apparatus 1004.

As discussed supra, the component 198 is configured to receive downlink communication from a network node. The component 198 may further transmit, to a network node, a request for a first downlink transmission power adjustment for the downlink communication from the network node to the UE. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for receiving downlink communication from a network node, means for transmitting, to the network node, a request for a first downlink transmission power adjustment for the downlink communication from the network node to the UE, means for measuring inter-UE interference to the downlink communication based on an uplink transmission from a second UE to the network node that overlaps in time with the downlink communication, wherein the request for the first downlink transmission power adjustment is in response to the inter-UE interference measured by the first UE, means for receiving, from the network node, an indication of a second downlink transmission power adjustment to be applied by the network node, means for receiving scheduling indicating one or more resources for downlink transmission power adjustment requests, means for transmitting the request for the first downlink transmission power adjustment in a scheduled resource, and means for transmitting the request for the first downlink transmission power adjustment in response to an occurrence of a condition or event. The means may be the component 198 of the apparatus 1004 configured to perform the functions recited by the means. As described supra, the apparatus 1004 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 11:
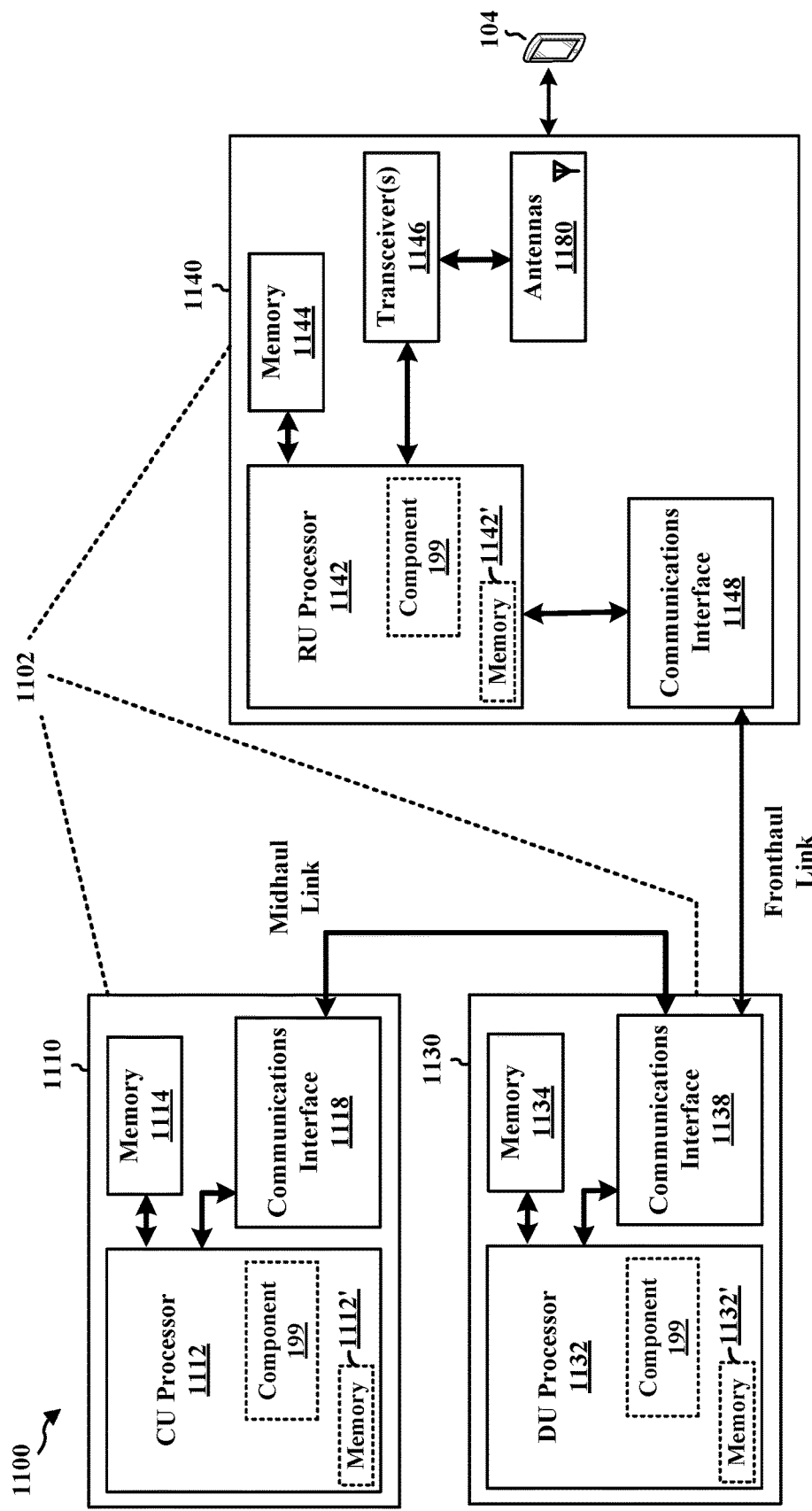
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to output downlink communication for a first UE. The component 199 may further obtain a request from the first UE for a first downlink transmission power adjustment for the downlink communication from the network node to the first UE. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for outputting downlink communication for a first UE, means for obtaining a request from the first UE for a first downlink transmission power adjustment for the downlink communication from the network node to the first UE, means for outputting an indication of a second downlink transmission power adjustment to be applied by the network node for the downlink communication with the first UE, means for outputting the downlink communication based on the second downlink transmission power adjustment, and means for outputting scheduling indicating one or more resources for downlink transmission power adjustment requests, wherein the at least one processor is further configured to obtain the request for the first downlink transmission power adjustment in a scheduled resource. The means may be the component 199 of the network entity 1102 configured to perform the functions recited by the means. As described supra, the network entity 1102 may include the Tx processor 316, the Rx processor 370, and the controller/processor 375. As such, in one configuration, the means may be the Tx processor 316, the Rx processor 370, and/or the controller/processor 375 configured to perform the functions recited by the means.

A wireless communication device that receives a downlink communication from a network node may be configured to transmit, to the network node, a request for a first downlink transmission power adjustment for the downlink communication. The request may be generated based on a determination that the downlink communication causes interference with an Rx signal. Such a request may rapidly and flexibly provide feedback for a desired Power adjustment to the network node, which may use the feedback to adjust the transmission power of the aggressor signal or the victim signal to minimize signal interference. By providing a desired Power adjustment to a network node, the network node may be able to make its own decision regarding the power adjustment based on other conditions, reports, and factors beyond what the wireless communication device provides to the network node. In some aspects, the desired Power adjustment may be based on PDSCH DMRS without requiring a CLI measurement resource, which is a faster computation to make. Moreover, sharing the computation may also be rapid, as the feedback may piggyback on an existing ACK/NACK infrastructure, which may be more flexible and accurate than a CLI report from a UE in some aspects.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, including receiving downlink communication from a network node. The method may also include transmitting, to the network node, a request for a first downlink transmission power adjustment for the downlink communication from the network node to the UE.

Aspect 2 is the method of aspect 1, where the network node may be a base station or a component of the base station. The request for the first downlink transmission power adjustment may be in response to cross-link interference from an uplink transmission of a second UE to the network node.

Aspect 3 is the method of any of aspects 1 and 2, further including measuring inter-UE interference to the downlink communication based on an uplink transmission from a second UE to the network node that overlaps in time with the downlink communication. The request for the first downlink transmission power adjustment may be in response to the inter-UE interference measured by the first UE.

Aspect 4 is the method of aspect 3, where the inter-UE interference may be measured based on a PDSCH DMRS from the network node.

Aspect 5 is the method of any of aspects 1 to 4, where the request is indicated in an ACK for a downlink transmission from the network node.

Aspect 6 is the method of any of aspects 1 to 5, where the request indicates a recommended value or a recommended offset value for a downlink transmission power of the network node for the downlink communication with the first UE.

Aspect 7 is the method of any of aspects 1 to 6, where the first downlink transmission power adjustment is associated with one or more of an MCS or a transport block size of the downlink communication received from the network node.

Aspect 8 is the method of aspect 7, where the first downlink transmission power adjustment is associated with a currently received PDSCH.

Aspect 9 is the method of any of aspects 1 to 8, where the request may be indicated for one or more resources based on at least one of (a) one or more downlink channels, (b) a reference EPRE, (c) one or more beam directions, (d) one or more frequency sub-bands, (e) one or more symbols, or (f) a resource pattern in at least one time or frequency.

Aspect 10 is the method of any of aspects 1 to 9, where the first downlink transmission power adjustment is based on a target quality of a downlink reference channel or a downlink reference signal.

Aspect 11 is the method of any of aspects 1 to 10, further including receiving, from the network node, an indication of a second downlink transmission power adjustment to be applied by the network node.

Aspect 12 is the method of aspect 11, where the indication of the second downlink transmission power adjustment may be for a subset of resources in at least one of time or frequency.

Aspect 13 is the method of any of aspects 1 to 12, further including receiving scheduling indicating one or more resources for downlink transmission power adjustment requests. The method may further include transmitting the request for the first downlink transmission power adjustment in a scheduled resource.

Aspect 14 is the method of any of aspects 1 to 13, further including transmitting the request for the first downlink transmission power adjustment in response to an occurrence of a condition or event.

Aspect 15 is the method of any of aspects 1 to 14, further including using at least one transceiver or at least one antenna to transmit the request for the first downlink transmission power adjustment.

Aspect 16 is a method of wireless communication at a network node, including outputting downlink communication for a first UE. The method may further include obtaining a request from the first UE for a first downlink transmission power adjustment for the downlink communication from the network node to the first UE.

Aspect 17 is the method of aspect 16, where the network node may include a base station or a component of the base station. The method may further include receiving uplink communication from a second UE. The request for the first downlink transmission power adjustment may be based on cross-link interference from the uplink communication of the second UE.

Aspect 18 is the method of any of aspects 16 to 17, where the request may be based on inter-UE interference to a PDSCH DMRS in the downlink communication from the network node.

Aspect 19 is the aspect of any of aspects 16 to 18, where the request may be indicated in an ACK for a downlink transmission from the network node.

Aspect 20 is the aspect of any of aspects 16 to 19, where the request may indicate a recommended value or a recommended offset value for a downlink transmission power of the network node for the downlink communication with the first UE.

Aspect 21 is the aspect of any of aspects 16 to 20, where the first downlink transmission power adjustment may be associated with an MCS or a transport block size of the downlink communication received from the network node.

Aspect 22 is the aspect of aspect 20, where the first downlink transmission power adjustment may be associated with a transmitted PDSCH.

Aspect 23 is the aspect of any of aspects 16 to 22, where the request may be indicated for one or more resources based on at least one of (a) one or more downlink channels, (b) a reference EPRE, (c) one or more beam directions, (d) one or more frequency sub-bands, (e) one or more symbols, or (f) a resource pattern in at least one time or frequency.

Aspect 24 is the aspect of any of aspects 16 to 23, where the first downlink transmission power adjustment requested may be based on a target quality of a downlink reference channel or a downlink reference signal.

Aspect 25 is the aspect of any of aspects 16 to 24, further including outputting an indication of a second downlink transmission power adjustment to be applied by the network node for the downlink communication with the first UE. The method may further include outputting the downlink communication based on the second downlink transmission power adjustment.

Aspect 26 is the aspect of any of aspects 16 to 25, where the indication of the second downlink transmission power adjustment may be for a subset of resources in at least one of time or frequency.

Aspect 27 is the aspect of any of aspects 16 to 26, further including outputting scheduling indicating one or more resources for downlink transmission power adjustment requests. The method may further include obtaining the request for the first downlink transmission power adjustment in a scheduled resource.

Aspect 28 is the aspect of any of aspects 16 to 27, where the request for the first downlink transmission power adjustment may be based on an occurrence of a condition or event.

What is claimed is:

1. An apparatus for wireless communication at a first user equipment (UE), comprising:
    memory; and
    at least one processor coupled to the memory and configured to:
        receive downlink communication from a network node; and
        transmit, to the network node, a request for a first downlink transmission power adjustment for the downlink communication from the network node to the UE in response to a detection of cross-link interference (CLI) between the received downlink communication from the network node and an uplink transmission of a second UE to the network node.

2. The apparatus of claim 1, wherein the network node is a base station or a component of the base station, wherein the at least one processor is further configured to:

detect the CLI between the received downlink communication from the network node and the uplink transmission of the second UE to the network node.

3. The apparatus of claim 1, wherein the at least one processor is further configured to:
measure inter-UE interference to the downlink communication based on the uplink transmission from the second UE to the network node that overlaps in time with the downlink communication, wherein the request for the first downlink transmission power adjustment is in response to measurement of the inter-UE interference by the first UE.

4. The apparatus of claim 3, wherein, to measure the inter-UE interference to the downlink communication, the at least one processor is configured to:
measure the inter-UE interference based on a physical downlink shared channel (PDSCH) demodulation reference signal (DMRS) from the network node.

5. The apparatus of claim 1, wherein, to transmit the request for the first downlink transmission power adjustment for the downlink communication from the network node to the UE, the at least one processor is configured to:
transmit, to the network node, an acknowledgment (ACK) for a downlink transmission, wherein the ACK comprises the request.

6. The apparatus of claim 1, wherein the request comprises an indication of a recommended value or a recommended offset value for a downlink transmission power of the network node for the downlink communication with the first UE.

7. The apparatus of claim 1, wherein the first downlink transmission power adjustment is associated with one or more of a modulation and coding scheme (MCS) or a transport block size of the downlink communication received from the network node.

8. The apparatus of claim 7, wherein the first downlink transmission power adjustment is associated with a currently received physical downlink shared channel (PDSCH).

9. The apparatus of claim 1, wherein the request is indicated for one or more resources based on at least one of:
one or more downlink channels,
a reference energy per resource element (EPRE),
one or more beam directions,
one or more frequency sub-bands,
one or more symbols, or
a resource pattern in at least one of time or frequency.

10. The apparatus of claim 1, wherein the first downlink transmission power adjustment is based on a target quality of a downlink reference channel or a downlink reference signal.

11. The apparatus of claim 1, wherein the at least one processor is further configured to:
receive, from the network node, an indication of a second downlink transmission power adjustment to be applied by the network node in response to the transmitted request.

12. The apparatus of claim 11, wherein the indication of the second downlink transmission power adjustment is for a subset of resources in at least one of time or frequency.

13. The apparatus of claim 1, wherein the at least one processor is further configured to:
receive scheduling indicating one or more resources for downlink transmission power adjustment requests, wherein, to transmit the request for the first downlink transmission power adjustment for the downlink communication from the network node to the UE, the at least one processor is configured to:
transmit the request for the first downlink transmission power adjustment in the indicated one or more resources for downlink transmission power adjustment requests.

14. The apparatus of claim 1, wherein the request comprises an indication for the network node to increase a transmission power for a second downlink communication to meet or exceed a threshold in response to the detection of the CLI, wherein the at least one processor is further configured to:
receive the second downlink communication transmitted using the transmission power that meets or exceeds the threshold after transmission of the request for the first downlink transmission power adjustment.

15. The apparatus of claim 1, further comprising at least one transceiver or at least one antenna coupled to the at least one processor, wherein, to transmit the request for the first downlink transmission power adjustment for the downlink communication from the network node to the UE, the at least one processor is configured to:
transmit, via the at least one transceiver or the at least one antenna, the request for the first downlink transmission power adjustment.

16. An apparatus for wireless communication at a network node, comprising:
memory; and
at least one processor coupled to the memory and configured to:
output downlink communication for a first user equipment (UE);
receive uplink communication from a second UE; and
obtain a request from the first UE for a first downlink transmission power adjustment for the downlink communication from the network node to the first UE, wherein the request for the first downlink transmission power adjustment is based on detected cross-link interference (CLI) between the output downlink communication for the first UE and the received uplink communication from the second UE.

17. The apparatus of claim 16, wherein the network node is a base station or a component of the base station.

18. The apparatus of claim 16, wherein the request is based on inter-UE interference to a physical downlink shared channel (PDSCH) demodulation reference signal (DMRS) in the downlink communication from the network node.

19. The apparatus of claim 16, wherein, to obtain the request from the first UE for the first downlink transmission power adjustment for the downlink communication from the network node to the first UE, the at least one processor is configured to:
obtain, from the first UE, an acknowledgment (ACK) for the downlink transmission, wherein the ACK comprises the request.

20. The apparatus of claim 16, wherein the request comprises an indication of a recommended value or a recommended offset value for a downlink transmission power of the network node for the downlink communication with the first UE.

21. The apparatus of claim 16, wherein the first downlink transmission power adjustment is associated with a modulation and coding scheme (MCS) or a transport block size of the downlink communication received from the network node.

22. The apparatus of claim 20, wherein the first downlink transmission power adjustment is associated with a transmitted physical downlink shared channel (PDSCH).

23. The apparatus of claim 16, wherein the request is indicated for one or more resources based on at least one of:
one or more downlink channels,
a reference energy per resource element (EPRE),
one or more beam directions,
one or more frequency sub-band,
one or more symbols, or
a resource pattern in at least one of time or frequency.

24. The apparatus of claim 16, wherein the first downlink transmission power adjustment requested is based on a target quality of a downlink reference channel or a downlink reference signal.

25. The apparatus of claim 16, wherein the at least one processor is further configured to:
output an indication of a second downlink transmission power adjustment to be applied by the network node for the downlink communication with the first UE; and
output the downlink communication based on the second downlink transmission power adjustment.

26. The apparatus of claim 25, wherein the indication of the second downlink transmission power adjustment is for a subset of resources in at least one of time or frequency.

27. The apparatus of claim 16, wherein the at least one processor is further configured to:
output scheduling indicating one or more resources for downlink transmission power adjustment requests, wherein, to obtain the request from the first UE for the first downlink transmission power adjustment for the downlink communication from the network node to the first UE, the at least one processor is configured to:
obtain the request for the first downlink transmission power adjustment in the indicated one or more resources for downlink transmission power adjustment requests.

28. The apparatus of claim 16, wherein the request for the first downlink transmission power adjustment is based on an occurrence of a condition or event.

29. A method of wireless communication at a first user equipment (UE), comprising:
receiving downlink communication from a network node; and
transmitting, to the network node, a request for a first downlink transmission power adjustment for the downlink communication from the network node to the UE in response to a detection of cross-link interference (CLI) between the received downlink communication from the network node and an uplink transmission of a second UE to the network node.

30. A method of wireless communication at a network node, comprising:
outputting downlink communication for a first user equipment (UE);
receiving uplink communication from a second UE; and
obtaining a request from the first UE for a first downlink transmission power adjustment for the downlink communication from the network node to the first UE, wherein the request for the first downlink transmission power adjustment is based on detected cross-link interference (CLI) between the output downlink communication for the first UE and the received uplink communication from the second UE.

* * * * *